United States Patent [19]
Greenberg

[11] 3,974,784
[45] Aug. 17, 1976

[54] SOLID-LIQUID WASTE INCINERATOR UTILIZING LIQUID CATALYSTS

[75] Inventor: Jacob Greenberg, Margate, N.J.

[73] Assignee: Anti-Pollution Systems, Inc., Pleasantville, N.J.

[22] Filed: Apr. 17, 1975

[21] Appl. No.: 569,066

[52] U.S. Cl. ............... 110/8 R; 110/8 A; 110/119
[51] Int. Cl.² ........................................ F23G 7/00
[58] Field of Search ........... 110/7 R, 7 B, 8 R, 8 A, 110/119; 423/210.5

[56] References Cited
UNITED STATES PATENTS

| | | | |
|---|---|---|---|
| 3,068,812 | 12/1962 | Hemeon | 110/8 |
| 3,647,358 | 3/1972 | Greenberg | 110/7 X |
| 3,671,185 | 6/1972 | Lefrancois et al. | 110/7 X |
| 3,780,674 | 12/1973 | Liu | 110/8 |
| 3,822,653 | 7/1974 | Ghelfi | 110/8 |

*Primary Examiner*—Kenneth W. Sprague
*Attorney, Agent, or Firm*—Albert W. Preston, Jr.

[57] ABSTRACT

A solid-liquid waste incinerator is disclosed which provides a novel thermodynamic interaction between a liquid catalyst, which is employed for cleansing the exhaust gases from the incinerator, and a combustion stage in which the solid-liquid wastes are burned, thereby reducing their volume by about ninety percent. Generally, solid-liquid wastes are introduced into a combustion chamber, and are initially heated by indirectly contacting molten salts or other hot liquid catalysts. A burner disposed directly above the wastes also heats the wastes to produce combustion of the wastes into exhaust gases and a greatly reduced volume of ash residue. During the combustion process, the burner, together with the heat produced from the combustion of the wastes, act to reheat the liquid catalyst. The exhaust gases produced are communicated to a gas treatment stage, also disposed within the incinerator housing, which is basically comprised of the molten salt or other liquid catalyst, through which the exhaust gases are drawn by an exhaust means. The gas treatment stage acts to remove many of the objectionable impurities within the exhaust gases prior to their release into the atmosphere.

14 Claims, 5 Drawing Figures

SOLID-LIQUID WASTE INCINERATOR UTILIZING LIQUID CATALYSTS

BACKGROUND OF THE INVENTION

The present invention relates to the field of solid and liquid waste disposal units, and particularly to incinerators which are used for that purpose.

Generally, there are many advantages to incinerating solid and liquid wastes. In particular, the incineration of these wastes reduces the solids to be disposed of to an inert, mineral ash, which is approximately ten percent of the initial weight of the original wastes. Additionally, where inert elements, such as metals and glass, are constituents of the wastes to be disposed of, incineration makes final separation of these desirable materials much more practical. Alternatively, in a non-oxidizing environment, incineration allows for the reclamation of organic materials by operating the incinerator as a pyrolysis unit. Finally, the incineration of unwanted wastes produces great quantities of heat which may be tapped as a vital energy source for power generation or heating.

Recently, however, growing concern with the environmental consequences of incineration, and particularly those environmental problems which are caused by exhausting unclean stack gases into the atmosphere, have shifted the emphasis in solid and liquid wastes disposal to landfills, land reclamations, ocean dumping and various composting techniques. These various alternatives have met with limited success, in part due to the fact that many of these alternative processes have produced secondary environmental problems which are also of grave concern.

Recently, much attention has been directed towards the cleansing of stack gases, and particularly the stack gases produced by fossil fuel burning power plants, in an effort to reduce the air contamination which heretofore has accompanied the operation of these installations. Currently, the recognized technique for cleansing stack gases is to place various antipollution devices "downstream" from the incineration zone. Generally, these antipollution devices include cyclonic and electrostatic precipitators, as well as wet and dry lime scrubbers.

More recently, methods such as those described in my prior U.S. Pat. No. 3,647,358, relating to methods of catalytically inducing the oxidation of carbonaceous materials by the use of molten salts, have provided alternative means for removing normally unburned pollutant products of combustion, such as carbon, carbon monoxide and hydrocarbons, by contacting such materials with a molten salt. Methods of this general nature have proved to be particularly useful, not only in treating gaseous media, but also in facilitating the catalytic oxidation of solid and liquid materials. These, and similar methods, are described in U.S. Pat. Nos. 3,647,358 and 3,642,583 and 3,766,087.

SUMMARY OF THE INVENTION

The present invention discloses a novel incinerator for solid and/or liquid wastes, and particularly for sewage sludge, which comprises a housing, a first burning stage within the housing for burning the wastes to produce exhaust gases and a residual volume of ash residue, novel feed means for introducing the wastes into the burning stage, novel discharge means for removing the residual volume of ash residue from the burning stage and a gas treatment stage within the housing which generally comprises a liquid catalyst. At least a portion of the catalyst is in direct heat transfer relation with the wastes during burning, thereby providing a novel thermodynamic "fly-wheel" effect which increases the efficiency of the process. Communication means are provided to allow the exhaust gas to pass from the burning stage into the gas treatment stage, at which time the exhaust gas is drawn through the liquid catalyst by a negative pressure which is produced by a novel cyclonic exhaust blower, which also acts to expel the cleansed exhaust gases into the atmosphere.

Applicants have found that sewage sludge containing more than eighty-five percent water should not be allowed to contact a salt bath over 1000°F, due to the detonation phenomenon observed if the sludge is added in greater than 100cc units at one time. This detonation phenomenon is caused by the fact that upon contacting the salt bath, heat transfer from the salt bath to the sludge becomes so rapid that the bath which is immediately contiguous to the sludge, will freeze, forming a nugget with solid salt on the outside and water and hydrocarbons on the inside. Since crystal salt lattice energies are in the order of 20,000 pounds per square foot, the solid hard outside shell of the nugget acts to contain the internal pressure produced by the vaporization of the water and hydrocarbons contained within the nugget. Once a high enough internal pressure is obtained, the crystal outer wall may be exploded with dramatic force.

Additionally, when sewage sludge or other wastes are dumped directly into a molten salt bath, there is an extremely rapid loss of water and volatile hydrocarbons, which tend to cool the molten salt mixture. Since it is necessary to reach a temperature of at least 1400°F in order to facilitate the oxidation of all of the residual hydrocarbons in the bath, and since the bath itself is an excellent heat sink, it is difficult to obtain the proper oxidation temperatures utilizing a direct dump method.

Finally, as the ash accumulates in a bath into which large volumes of wastes have been directly dumped, a filtering or cleansing process must be employed in order to remove those contaminates, and particularly the ash which builds up in those molten salt baths.

The present invention overcomes each of the above described disadvantages, by providing for the introduction of wastes of all kinds into a first burning chamber which is physically isolated from the molten salt baths, but which utilizes the tremendous heat capacity of the bath to aid in bringing the wastes up to combustion temperature. By separately isolating the molten salt bath from the burning chamber, and by utilizing a burner to focus heat directly on the wastes, it is no longer a problem to bring the combustion temperature of the wastes up to the desired 1400°F. Finally, by isolating the burning stage from the gas treatment stage, it is possible to virtually eliminate the necessity of filtering or cleansing the molten salt bath since the residual ash residues are removed by directly from the reaction chamber and are not generally permitted to contact the molten salt bath.

A primary object of the present invention is to provide an incinerator which increases the efficiency of oxidizing solid and liquid wastes. Another object of the present invention is the provision of an incinerator utilizing a liquid catalyst which is physically separated from, but in direct heat transfer relationship with, the wastes prior to and during their combustion. A further aim of the present invention is the provision of an incinerator incorporating gas treatment means for catalytically oxidizing and otherwise purifying the incinerator exhaust gases while improving the efficiency of the incineration process. Those and other objects of the present invention will become apparent from the following detailed description.

DETAILED DESCRIPTION OF THE DRAWINGS

Figure 1:
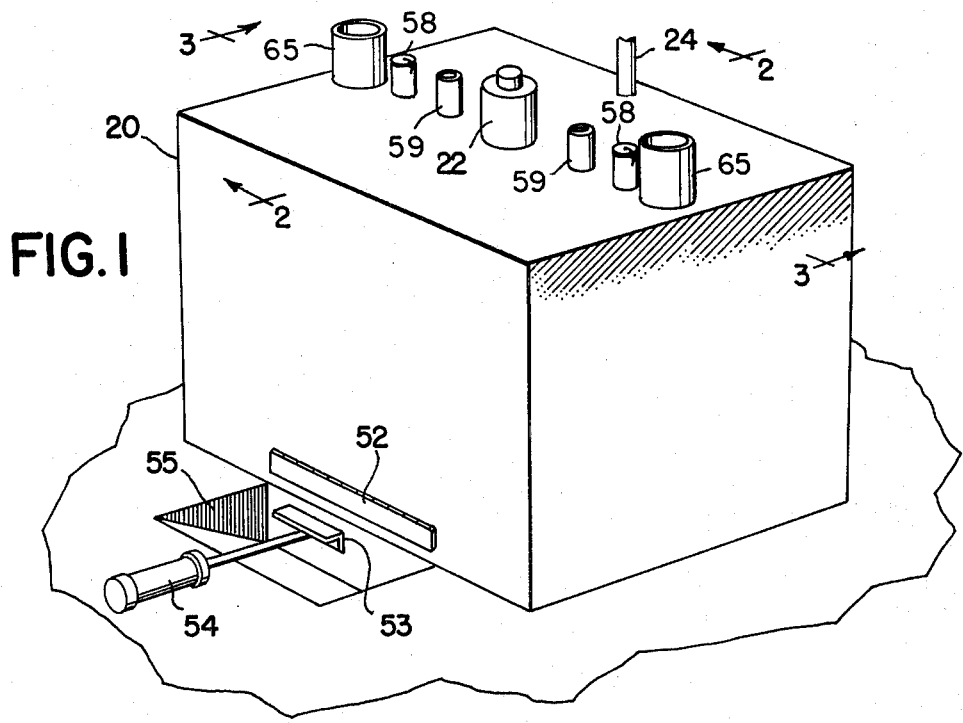
FIG. 1 is a diagrammatic perspective view of the incinerator of the present invention.

Referring now to FIG. 1, it can be seen that the incinerator of the present invention has a substantially box-shaped housing 20. This housing, as well as the other components described below, except as otherwise noted, are constructed of 300 series stainless steel. This material has been selected for its relatively good heat transfer characteristic as well as for its chemically inert nature. With the exception of the discharge means, which is located near the base of the housing, all exterior communication to the incinerator is by means of conduit members located along the top surface of the housing.

Figure 2:
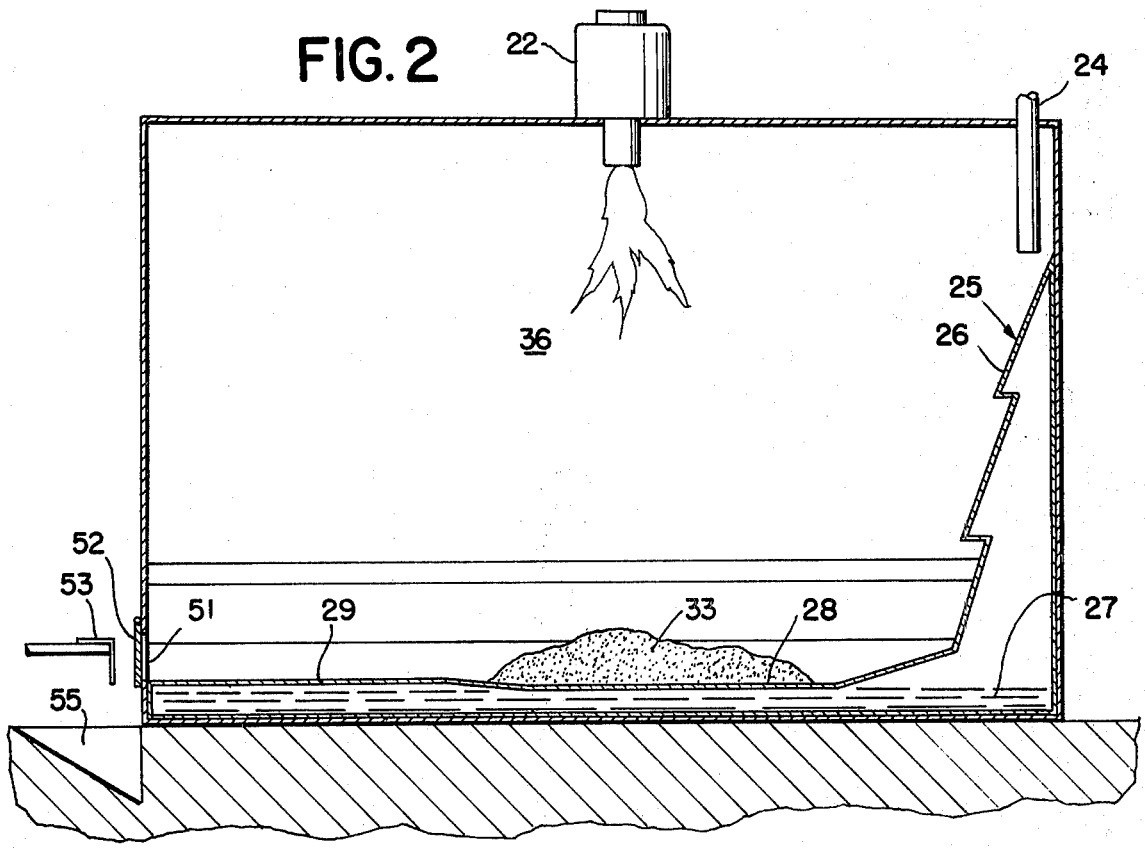
FIG. 2 is a cross section of the incinerator shown in FIG. 1 taken along the lines 2—2.

The solid or liquid sludge to be incinerated is introduced into the incinerator by way of the feed means, which comprises a feeder pipe 24 disposed through the top surface of the housing 20 and oriented, as shown in FIG. 2, over a splash plate 25, which is formed to extend out from the housing wall having a number of raised deflectors 26 formed to therein for the purpose of throwing the sewage sludge or other waste material towards the center waste retention area 28 of the base plate 29. After introduction, the waste 33 generally tends to settle in the waste retention center 28 of the base plate as shown in FIG. 2.

Figure 3:
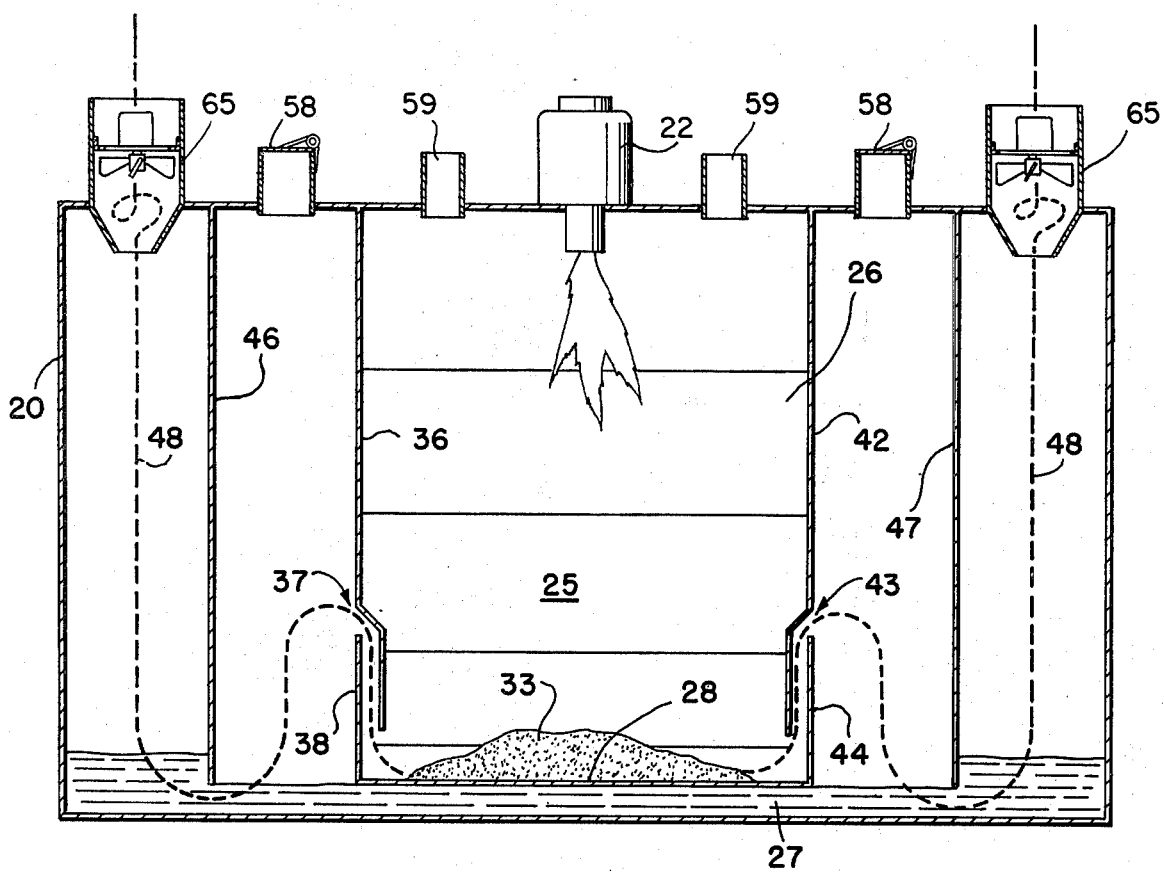
FIG. 3 is a cross section of the incinerator shown in FIG. 1 taken along the lines 3—3 as shown in FIG. 1.

Referring now to FIG. 3, it can be seen that the waste to be incinerated is introduced into the burning stage which is comprised of a burner 22, air intakes 59 disposed on either side of the burner 22, and a reaction chamber which is defined by the splash plate 25, first and second side baffles 36 and 42, the base plate 29, first and second retaining baffles 38 and 44, and the relevant portions of the housing 20. As seen in FIG. 3, the waste 33, as it resides in the waste retention area 28, is disposed directly below the burner 22. The burner 22 may be gas, oil or electricity powered, however, depending upon the wastes, it is possible that the amount of heat which must be added to the fuel for combustion may be negligible. This phenomenon results from the fact that a liquid molten salt catalyst, at a temperature of approximately 1000°F is disposed directly below the base plate 29, and more particularly, directly below the waste retention area 28. Since the base plate 29 is constructed from stainless steel, as noted above, after the initial introduction of the waste 33, the molten salt bath will have the effect of warming the waste 33 so that a minimal amount of additional energy must be added in order to obtain combustion temperatures.

Referring again to FIG. 3, the communication means of the present invention for allowing the exhaust gas produced by combustion to pass from the burning stage to the gas treatment stage can clearly be seen. This communication means is defined by the first and second side baffles, 36 and 42, the first and second retaining baffles, 38 and 44, the first and second intermediate baffles, 46 and 47, and the relevant portions of housing 20, and comprises bypass valves 58. As will be described hereinafter, exhaust gases from the combustion of the waste 33 will travel through openings 43 and 37, disposed on either side of the waste mass, thereby allowing those exhaust gases to follow the path as illustrated by the dotted line 48 in FIG. 3. In addition to providing fluid communication between the burning chamber and the gas treatment stage, the communication means of the present invention includes a pressure sensitive bypass valve 58 which is normally held in the closed position by a pressure sensitive spring or other means, but which may act as a safety release in the event of an increase in the pressure within the burning chamber, or alternatively, in the event that the normal exhaust route does not function, either due to the solidification of the molten salt or by reason of another blockage in the normal exhaust path. A further function of the novel communication means of the present invention is to provide insulation between the burning chamber and the exhaust means which is described below.

In particular, the novel communication means of the present invention is of importance in those installations where the nature of the wastes to be burned is such that no burner 22 is required. In this instance, the incinerator would be filled with combustible wastes and ignited in the conventional manner. Since, at start-up, the molten salt would be solidified, the exhaust gases would not be able to pass through the gas treatment stage to be exhausted through the normal means. Therefore, the novel bypass valves 58 of the present invention become particularly important during this preliminary start-up phase, at which time the exhaust gases may be passed into the atmosphere directly from the novel communication means. Experience has shown that the time which is required for this combustion to produce enough heat to melt the salt disposed in the gas treatment stage in minimal, and therefore, very shortly after the beginning of incineration, the exhaust gases begin to follow the path outlined by the dotted line 48 in FIG. 3. It should also be noted, that alternatively the burner 22 may be utilized in order to prime the incinerator prior to receiving any waste materials, and to melt the salt which is disposed in the gas treatment stage. In this instance, the bypass valves 58 work in much the same manner as that described above.

After passing through the communication means described above, the exhaust gases are drawn through a liquid catalyst 27 which comprises the gas treatment stage. The preferred liquid catalyst 27 of the present invention comprises molten salts. Molten salts have a density, depending upon temperature, that is 1 ¼ to 2 times that of water. At 200°F above their normal melting point, simple ionic salts have a viscosity similar to water. Molten salt baths have a liquid range of several hundreds of degrees, where the vapor pressure of the system is in the range of water at room temperature. In addition, simple salt baths have a high wetting or wicking action due to the inherent charge characteristics which they possess. All these properties, high density, low viscosity, long liquid range, and high wetting coefficient, make these liquids excellent particulate scrubbers. In fact, in order to perform in equal efficiency, eighty times the weight of water would be necessary in order to obtain the same efficiency in a water scrubber as that presently obtained by the molten salts of the present invention. Additionally, molten salts have the extra added advantage of removing toxic materials such as beryllium or arsenic in the parts per million range.

The incinerator of the present invention may be considered to be a chemical reactor, wherein materials are primarily combined with oxygen. The efficiency of this reaction is enhanced using a liquid catalyst. Liquid catalysts have significant advantages over conventional catalysts, which are normally finely divided solids that need large surface exposures and redundant systems. Since a liquid theoretically has an infinite surface, a liquid catalyst is desired to obviate the problems associated with solid catalysts, namely, surface poisoning. Industrial societies have great need of inexpensive, liquid catalysts to facilitate large-scale chemical reactions to protect the environment. The present invention provides an incinerator incorporating an inexpensive and plentiful catalyst, namely, molten salts, that are in one alternative embodiment brined.

The molten salt which is employed in the present invention may be any of the types of salts disclosed for that purpose in my previously issued patent, U.S. Pat. No. 3,647,358, entitled "Method of Catalytically Inducing Oxidation of Carbonaceous Materials by Use of Molten Salts", which issued on Mar. 7, 1972, and is specifically incorporated herein.

Since most simple salts have a heat capacity that is four times that of iron, including the heat of fusion, a two-inch layer of molten salts would have approximately the same heat capacity of ten-inch bed of cast iron. For this reason, the properties of the molten salts of the present invention are particularly useful in the incinerator in the present invention by reason of the "fly-wheel effect" which the salts provide the incinerator. That is, as heat is generated in the burning of wastes, the heat is absorbed by the salt by reason of its contact both through the wall of the reaction chamber, and through the contact of the exhaust gases with the molten salt in the gas treatment stage. As burning progresses, the accompanying rise in temperature makes the use of supplemental fuel negligible. The utilization of first and second side baffles 36 and 42, first and second retaining baffles 38 and 44, and first and second intermediate baffles 46 and 47, provides the pre-heating of combustion air and other beneficial heat transfer phenomena.

In addition to the scrubbing and catalytic activities described above, the gas treatment stage also acts as an extremely effective and efficient afterburner. As mentioned above, extremely rapid heat transfer is accomplished by bubbling the exhaust gases through the molten salts in the gas treatment stage. As a result, latent organic materials contained in the exhaust gases are quickly brought to their ignition temperature and are burned in the presence of oxygen. Experiments with the incineration of sewage sludge and pathological wastes indicate that a residence time of 0.1 second at 1100°F is sufficient for complete odor removal and oxidation of organic vapors. This compares with the requirements of a standard afterburner with design criteria of 0.3 second residence time at 1400°F.

Finally, the liquid catalysts of the present invention may be used as a chemical solvent for noxious gases. Since chemical reactions in molten salts are analogous to those in aqueous media, it is possible to utilize other chemical reagents which may be dissolved within the gas treatment stage. The incinerator of the present invention, however, because of the elevated temperatures obtained in the gas treatment stage, bring the reaction kinetics into the millisecond range. Therefore, the use of lime as a "getter" or $SO_x$ or $NO_x$ is extremely effective. Extremely rapid stoichiometric reactions may be expected. Additionally, the high reaction temperatures of the gas treatment stage may additionally act to activate agents which are normally chemically inactive at room temperatures. Alumina is such an example.

The exhaust gases within the gas treatment stage (including particulates) are therefore subjected not only to catalytic oxidation, but also to particulate scrubbing, afterburning, and in some embodiments, chemical solvents dissolved or suspended in the liquid catalyst of the gas treatment stage.

The exhaust gases are drawn through the gas treatment stage by the exhaust means for expelling the exhaust gases into the atmosphere, either directly or by way of a stack (not shown in the drawings). The exhaust gas flow, designated by a dotted line in FIG. 3 and by reference numeral 48, can be seen to emanate at the solid or liquid waste 33, to pass through the openings defined by the side baffles and retaining baffles, to be drawn through the liquid catalysts, and to pass within the space between the intermediate baffles and the appropriate side walls of the housing 20, prior to being exhausted from the incinerator. The exhaust means of the present invention, is defined by the first and second intermediate baffles 46 and 47, the relevant portions of housing 20 and comprises a cyclonic exhaust blower 65. The cyclonic exhaust blower of the present invention comprises a fan which should withstand operating temperatures of approximately 850°F at a pressure of six inches of water column. The cyclonic exhaust blower 65 creates a negative pressure within the system, as shown by the higher level of liquid catalysts 27 as it is drawn into the exhaust means of the present invention. In order to prevent salt carry out, gas velocities are normally kept below 400 feet per minute, however, higher velocities may be obtained with the use of a modified cyclonic exhaust blower. The creation of a negative pressure within the burning stage, and particularly within the reaction chamber, provides a safety factor against unwanted pressure build-up. Additional safety factors are provided by the large bore of the feeder pipe 24, which is used for the introduction of the wastes 33. This is done to prevent plugging upon shutdown due to heat. Finally, the location of the burner 22 in the top wall of the housing 20, thereby providing a downward method of firing, coupled with the downward air intake 59, tends to lessen the movement of fly-ash and helps to control the particulate emissions. Those particulate emissions which do not pass out of the inner reaction chamber and which are not scrubbed from the exhaust gases by the gas treatment stage will normally be trapped and be prevented from leaving the incinerator by the cyclonic exhaust blower 65, which is intended to create a vortex, as shown by the spiral line of gas flow 48 within the cyclonic exhaust blower 65 immediately prior to the fan.

After burning has been completed, the waste 33 has been reduced by approximately 90 percent. The residual fly ash will be retained primarily on the base plate, and in particular, on the waste retention area 28 of the base plate 29. The novel configuration of the present invention allows this fly ash and the other residues of oxidation to be removed without bringing these residues into contact with the liquid catalyst bath. The novel discharge means of the present invention is diagrammatically shown in FIG. 1. This discharge means generally comprises an access cover 52, an ash remover 53, an ash disposal pit 55, and an actuator 54. For removal of the fly ash, the access cover, which is hinged along one edge, is raised to reveal an access port 51 which is shown in FIG. 2. The ash remover 53 is then guided into the inner reaction chamber to draw the ash residue out of the inner reaction chamber to be disposed of in an appropriate manner. It should be understood that the discharge means for removing ash, which is herein described, is not intended to be limited to the particular diagrammatic representation shown in FIGS. 1 and 2, but rather may be any suitable discharge means for removing ashes from an incinerator known to the art, including, but not limited to, shovel means, conveyor means, screw means or other mechanical removal means.

From the above description it may be seen that a novel and very efficient incinerator for solid or liquid wastes material is provided utilizing a molten salt bath which alternatively warms and is warmed by the wastes to be incinerated. An oil fired sludge incinerator of this general type has been in experimental operation for an extended period of time. The operating conditions for this incinerator are shown in table I.

TABLE I

Sludge Incinerator

| Sludge Content | | Feed Rate | Salt Temp. | Fuel Efficiency w/o Heat Recovery | Particulate Emission |
|---|---|---|---|---|---|
| % Solid | % Water | | | | |
| 2 | 98 | 30–40 lbs. sq. | | 85% | |
| 6 | 94 | ft. of base plate | 1050°F | 51% | 0.0169 |
| 12 | 88 | per hour | | 41% | g/scf |
| | | | | Av.59% | |

Since the salts chosen for application within the present incinerator are thermodynamically stable at the temperatures of operation, as well as to whatever chemicals to which they are exposed, they form a permanent part of the equipment and need not be replaced. Experience has shown their application to result in both economic and efficient systems, particularly for general hospital wastes and treatment of scrap metals.

It will be understood that various changes in the details, materials and arrangement of parts which have been herein described and illustrated in order to explain the nature of this invention may be made by those skilled in the art within the principal and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

I claim:
1. An incinerator for solid and liquid waste comprising
   a. a housing;
   b. a burning stage disposed within said housing for burning said waste to produce exhaust gas and a reduced volume of ash residue;
   c. feed means for introducing said waste into said burning stage;
   d. discharge means for removing said ash residue from said burning stage;
   e. a gas treatment stage disposed within said housing and comprising a liquid catalyst for catalytically treating said exhaust gas;
   f. communication means for allowing said exhaust gas to pass by a first path from said burning stage to said gas treatment stage;
   g. exhaust means for expelling said exhaust gas into the atmosphere; and,
   h. heat transfer means between said burning stage and said gas treatment stage for transferring heat along a second path so that said liquid catalyst is maintained liquid by the heat in said burning stage.

2. The incinerator of claim 1, wherein said burning stage comprises a reaction chamber which is contiguous to and in direct heat transfer relationship with at least a portion of said gas treatment stage.

3. The invention of claim 2, wherein at least a portion of which catalyst is in direct heat transfer relation with at least one of the surfaces of said reaction chamber.

4. An incinerator for solid and liquid waste comprising:
   a. a housing;
   b. a burning stage disposed within said housing for burning said waste to produce exhaust gas and a reduced volume of ash residue, said burning stage comprising a reaction chamber;
   c. feed means for introducing said waste into said burning stage;
   d. discharge means for removing said ash residue from said burning stage;
   e. a gas treatment stage disposed within said housing and comprising a liquid catalyst, for catalytically treating said exhaust gas, said reaction chamber being contiguous to and in direct heat transfer relationship with at least a portion of said catalyst of said gas treatment stage;
   f. communication means for passing said exhaust gas from said burning stage to and through said gas treatment stage;
   g. exhaust means for expelling said exhaust gas into the atmosphere; and
   h. said reaction chamber further comprising a plate of a high heat transfer material in contact with at least a portion of said liquid catalyst, such that said plate provides a high heat transfer directly between said liquid catalyst and said waste.

5. The invention of claim 4, wherein said communication means further comprises a pressure sensitive bypass valve.

6. The invention of claim 4, wherein said liquid catalyst is a molten salt.

7. The invention of claim 6, wherein said exhaust means further comprises a cyclonic exhaust blower for drawing said exhaust gas through said liquid catalyst.

8. The invention of claim 7, wherein said feed means for introducing said waste into said burning stage comprises a feeder pipe disposed through said housing for introducing said waste onto a splash plate having deflectors for deflecting said waste onto a waste retention area formed by said base plate.

9. The invention of claim 8, wherein said burning stage further comprises air intakes and a burner disposed through that wall of said reaction chamber which opposes said waste retention area of said base plate.

10. The invention of claim 9, wherein said reaction chamber is box-shaped, and wherein said base plate is disposed to form the bottom surface of said chamber, wherein the portion of said housing through which said air intakes and blower are disposed forms the top of said chamber, wherein said splash plate forms at least one of the sides of said chamber, and wherein at least two opposing sides of said chamber are discontinuous baffles for allowing said exhaust gas to pass to said communication means, and wherein said discharge means further comprises an access port defined in the wall of said chamber which opposes said splash plate.

11. A method of incinerating solid and liquid wastes comprising the steps of
   a. preheating said waste by bringing said waste into a direct contact with a material which is heated by a molten salt bath;
   b. providing oxygen to said waste to promote combustion thereof;
   c. creating a negative pressure to draw the exhaust gases from said combustion through said molten salt bath; and
   d. exhausting said gases into the atmosphere.

12. The method of claim 11, wherein said preheating step also comprises the external application of heat to said waste.

13. The method of claim 12, wherein an additional step of precipitating particulate materials within said gas is performed prior to exhausting said gas into the atmosphere.

14. The method of claim 13, wherein the additional step of removing the ash residue without bringing said ash residue into contact with said molten salt is performed after the oxidation of waste is completed.

* * * * *